(12) United States Patent
Whitechapel et al.

(10) Patent No.: US 8,296,730 B2
(45) Date of Patent: Oct. 23, 2012

(54) USING EXTENSION METHODS TO EXTEND COM OBJECTS

(75) Inventors: David Andrew Whitechapel, Seattle, WA (US); Vladimir Morozov, Sammamish, WA (US); Phillip Michael Hoff, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 12/046,446

(22) Filed: Mar. 12, 2008

(65) Prior Publication Data

US 2009/0234804 A1    Sep. 17, 2009

(51) Int. Cl.
*G06F 9/44* (2006.01)
*G06F 9/45* (2006.01)

(52) U.S. Cl. .................... 717/116; 717/114; 717/148

(58) Field of Classification Search .................. None
See application file for complete search history.

(56) References Cited

U.S. PATENT DOCUMENTS

| | | | | |
|---|---|---|---|---|
| 5,696,974 | A * | 12/1997 | Agrawal et al. | 717/131 |
| 6,721,807 | B2 * | 4/2004 | Vlissides | 717/116 |
| 7,620,944 | B2 * | 11/2009 | Beccario et al. | 717/117 |
| 7,685,567 | B2 * | 3/2010 | Meijer et al. | 717/116 |
| 7,694,274 | B2 * | 4/2010 | Meijer et al. | 717/114 |
| 7,716,656 | B2 * | 5/2010 | Meijer et al. | 717/148 |
| 8,032,859 | B2 * | 10/2011 | Meijer et al. | 717/116 |
| 8,146,054 | B2 * | 3/2012 | Baker et al. | 717/116 |
| 2002/0099866 | A1 * | 7/2002 | Vlissides | 709/315 |
| 2004/0193575 | A1 | 9/2004 | Chen et al. | |
| 2005/0050528 | A1 * | 3/2005 | Wang | 717/148 |
| 2006/0015528 | A1 | 1/2006 | Hejlsberg et al. | |
| 2006/0053138 | A1 | 3/2006 | Meijer et al. | |
| 2006/0242655 | A1 | 10/2006 | Fernando et al. | |
| 2007/0028209 | A1 | 2/2007 | Meijer et al. | |
| 2007/0028210 | A1 * | 2/2007 | Meijer et al. | 717/114 |
| 2007/0050380 | A1 | 3/2007 | Meijer et al. | |
| 2007/0094673 | A1 * | 4/2007 | Hunt et al. | 719/321 |
| 2007/0256055 | A1 * | 11/2007 | Herscu | 717/115 |
| 2007/0271233 | A1 * | 11/2007 | Hejlsberg et al. | 707/3 |
| 2008/0127142 | A1 * | 5/2008 | Wrighton et al. | 717/148 |
| 2009/0144229 | A1 * | 6/2009 | Meijer et al. | 707/2 |

FOREIGN PATENT DOCUMENTS

WO    2007130227 A1    11/2007

OTHER PUBLICATIONS

Szypersky et al., "Engineering a Programming Language: The Type and Class System of Sather", Nov. 1993, Microsoft Research, TR-93-064, pp. 1-15; <http://research.microsoft.com/en-us/um/people/cszypers/pub/plsa94.pdf>.*
Oancea et al., "Parametric Polymorphism for Software Component Architectures", 2005 ACM, OOPSLA'05, pp. 147-166; <http://dl.acm.org/citation.cfm?doid=1094811.1094823>.*
Gregory Gadow, "Extend the .NET Library with Extension Methods", Mar. 20, 2009, Codeproject.com, pp. 1-8; <http://www.codeproject.com/Articles/34295/Extend-the-NET-Library-with-Extension-Methods>.*

\* cited by examiner

*Primary Examiner* — Thuy Dao
*Assistant Examiner* — Ben Wang (57) ABSTRACT

When objects are called by a program written in a strongly-typed language using an interface written in a loosely-typed manner, incompatibilities between the programming languages can cause problems. Extension methods can simplify the interface between objects in an object model and a program written in a strongly-typed programming language by providing method overloads that accept strongly-typed parameters. Extension methods are provided that use method overloads that accept strongly-typed parameters, improving type safety by allowing the compiler to enforce type safety rather than relying on type checking at runtime. Nullable types and object initialization may be used to provide strongly-typed optional parameters. Extension methods can be used to support parameterized properties and to support class indexers, enabling query of collections of in-memory objects.

20 Claims, 4 Drawing Sheets

USING EXTENSION METHODS TO EXTEND COM OBJECTS

BACKGROUND

Years ago, in the infancy of the computer age, it was not uncommon for a single programmer to write the entirety of a piece of software tailored to a particular task and even to a particular machine. Eventually, libraries of reusable pieces of code were developed so that already written and debugged code could be used again and again, thereby achieving efficiencies in software development.

Object-oriented programming languages have become very popular. An "object" in an object-oriented programming language is an encapsulated module of code and related data that is externally accessible through interfaces accessing well-defined and controlled connection points, known as the object's methods and properties. A collection of objects can be created to perform the functions desired in a computer application.

Component Object Model (COM) is a platform for software componentry used to enable interprocess communication and dynamic object creation in any programming language that supports the technology. The term COM is often used in the software development world as an umbrella term that encompasses the OLE, OLE Automation, Active®, COM+ and DCOM technologies. COM provides a language-neutral way of implementing objects so an object can be used in an environment different from the one in which it was created.

A recent development in the computer world is the creation of managed code environments. Managed code is computer program code that executes under the management of a virtual machine. In contrast, native (unmanaged) code is executed directly by a computer's central processing unit (CPU). The programming language used to create the program determines whether it will run as managed code or as unmanaged code. Virtual machine environments can support many types of programming languages, including both strongly-typed, early bound languages and loosely-typed languages.

When a program written in a strongly-typed language calls an object using an interface written in a loosely-typed manner, incompatibilities surface. In a loosely-typed, late-bound language the compiler does not do type-checking. Type incompatibilities are not detected until the program executes. If a type incompatibility is detected when a program is running, an exception is thrown. In contrast, a managed code language may be a strongly-typed and early-bound language, meaning that the compiler does type-checking at compile time. A program written in a strongly-typed programming language that makes a call to an object using an interface written in a loosely-typed manner will lose the advantages associated with compile-time type-checking.

A loosely-typed object-oriented programming language may make extensive use of optional parameters, variant types, and parameterized properties. In contrast, a strongly-typed language may not support optional parameters, named parameters, or parameterized properties. Sometimes variant types are handled awkwardly in a strongly-typed language. When a developer working in a strongly-typed language calls an object in a shared library using an interface written in a loosely-typed manner, these language incompatibilities can result in increased work for the developer, awkward program code, loss of desired language features and an increase in programming errors.

SUMMARY

Extension methods are provided that use method overloads that accept strongly-typed parameters, improving type safety by allowing the compiler to enforce type safety rather than relying on type checking at runtime. Nullable types and object initialization may be used to provide strongly-typed optional parameters. Extension methods can be used to support parameterized properties and to support class indexers, enabling query of collections of in-memory objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Microsoft® Visual Studio® is an Integrated Development Environment (IDE) that can be used to develop console and GUI applications, Windows Forms applications, web sites, web applications, and web services, etc. in native code and in managed code. Visual Studio® supports languages by means of language services, which allow any programming language to be supported by the code editor and debugger, if the language-specific service has been provided. Built-in languages include C/C++ (via Visual C++®), VB.NET (via Visual Basic .NET), and C# (via Visual C#®). Support for other languages such as F#, Python, and Ruby among others are also available via separately-installed language services. Visual Studio® also supports Extensible Markup Language ("XML"), Extensible Stylesheet Language Transformation ("XSLT"), Hypertext Markup Language ("HTML"), Extensible Hypertext Markup Language ("XHTML"), JavaScript and Cascading Style Sheet ("CSS").

The IDE is also responsible for coordinating and enabling communication between services. VSTO, or Visual Studio Tools for Office is part of Microsoft's Visual Studio .NET tools suite and supports the Microsoft NET Framework. It is used by developers to write code connecting applications including but not limited to a Microsoft® Word application, Excel® application and Outlook® application.

Automation is a formal inter-process communication mechanism based on COM that provides an infrastructure so that an application (an automation controller) can access and manipulate (i.e., set properties of or call methods on) shared automation objects exported by other applications. For example, a program being developed in Visual Studio® in C# may set properties of or call methods on an Office object such as a Microsoft® Word Document. Automation objects can be written in conventional languages such as C++ or in languages such as Visual Basic® and Borland Delphi.

An automation object is a COM object implementing one or more interfaces (such as but not limited to the IDispatch interface) between an automation object and a client application. An interface provides a pointer to a virtual function table that contains a list of pointers to the functions that implement the functions declared in the interface, in the same order that they are declared in the interface. The interface exposes a method that allows methods of a class to be called by name, with an arbitrary number of parameters. When called by a program written in a loosely-typed programming language, neither the name of the method nor the number (and exact types) of parameters needs to be known at compile time, because of late binding. For late binding, a client only needs to know the name (or class identifier (CLSID)) of the desired object and the names and parameters of methods it actually uses.

Implementing early binding is more troublesome. For early binding, the client needs to know the definition and interface identifier (IID) for each interface requested, as well as the position of each method in the interface virtual function table. In order to automate an application, the developer of an automation controller should know the object model that is employed by that application. For that reason, among others, when Automation components are provided, they are usually accompanied by type libraries, which contain metadata about classes, interfaces and other features exposed by an object library.

Type libraries are used to generate Proxy pattern/stub code for interoperating between COM and other platforms, such as Microsoft .NET and Java® platform. For instance, the .NET Framework SDK (Software Development Kit) includes tools that can generate a proxy .NET DLL to access Automation objects using both early binding (with information about interfaces extracted from a type library) and late binding (via IDispatch, mapped to the .NET Reflection API), with the built-in .NET-to-COM bridge called COM Interop. While a Java® platform lacks built-in COM support, toolsets like JACOB and jScgue can generate proxy source code (consisting of two parts, a set of Java® classes and a C++ source for a Java® Native Interface DLL) from type libraries.

Automation is available for a variety of languages, including, but not limited to C language, C++ language (directly or via a library like MFC or ATL), Visual Basic® and Visual Basic for. Applications languages, Delphi language, Microsoft .NET languages, Java® language, JScript and VBScript language, Perl language, PHP language, PowerBuilder language and Ruby language.

An automation object model such as Microsoft Office typically targets loosely-typed, late-bound languages such as VBA and Visual Basic and makes extensive use of automation capabilities such as optional parameters (many of which are enumerated types), variant types, and parameterized properties. To expose the object model to a managed code environment such as .NET, objects may be shipped with a set of assemblies (sometimes known as Primary Interop Assemblies or PIAs), which are thin wrappers around the objects in the model and which map the various automation types to their managed code equivalents. The wrapper acts as an interface between its caller and the wrapped code. This may be done for compatibility, e.g. if the wrapped code is in a different programming language or uses different calling conventions, or for security, e.g. to prevent the calling program from executing certain functions. The implication is that the wrapped code can only be accessed via the wrapper. An example of a PIA is an assembly that comes with an object model such as Microsoft Office that allows managed code (VB .NET, C#, etc.) to call Office code. For example, VSTO uses the PIAs to expose the Office object model to its add-ins and document-level customizations.

For example, the SaveAs method on the Microsoft® Word Document COM interface may be declared as follows:

```
HRESULT SaveAs(
    [in, optional] VARIANT * FileName, [in, optional] VARIANT *
FileFormat, [in, optional] VARIANT * LockComments, [in, optional]
VARIANT * Password, [in, optional] VARIANT * AddToRecentFiles,
[in, optional] VARIANT * WritePassword, [in, optional] VARIANT *
ReadOnlyRecommended, [in, optional] VARIANT *
EmbedTrueTypeFonts, [in, optional] VARIANT *
SaveNativePictureFormat, [in, optional] VARIANT * SaveFormsData,
[in, optional] VARIANT * SaveAsAOCELetter, [in, optional]
VARIANT * Encoding, [in, optional] VARIANT * InsertLineBreaks,
[in, optional] VARIANT * AllowSubstitutions, [in, optional]
VARIANT * LineEnding, [in, optional] VARIANT * FileAddBiDiMarks);
```

Managed code languages like C#, derived from strongly-typed and early-bound languages such as C++ language and Java® language, typically do not support optional parameters or parameterized properties. Variant parameters, used when the needed data type can only be known at runtime, when the data type is expected to vary, or when optional parameters and parameter arrays are desired, are also somewhat problematic in some managed code languages. For example, in managed code languages such as C#, the variant type is replaced with the object type. That is, a developer boxes parameters in objects, thereby losing the strongly-typed benefits of the language. Furthermore, some of the variant parameters may have to be passed by reference. To do so, an intermediate, temporary object is created on the stack, is assigned to the value being passed to the object model and then the intermediate object is passed with a keyword (e.g., "ref") to indicate that the object being passed is a reference. There are no direct conversions between the two types.

Hence, an equivalent of the COM SaveAs method declaration in the managed code language C#, may be:

```
void SaveAs(
    ref object FileName,
    ref object FileFormat, ref object LockComments, ref object Password,
    ref object
AddToRecentFiles, ref object WritePassword, ref object
ReadOnlyRecommended, ref object
EmbedTrueTypeFonts, ref object SaveNativePictureFormat, ref object
SaveFormsData, ref object SaveAsAOCELetter, ref object Encoding,
ref object InsertLineBreaks, ref object AllowSubstitutions,
ref object LineEnding, ref object AddBiDiMarks)
```

In this method, "FileName" is the only logically-required parameter in the object model and the next 15 parameters are logically-optional parameters. All of the parameters for SaveAs are passed as references to objects. Because C# does not support optional parameters, a C# developer would have to write the following code to call the C# SaveAs( ) method to save a document called "Foo.txt" (i.e. to pass a value ("Foo.txt") stored in an object (FileName) as the first parameter to the C# SaveAs method):

```
    object FileName = "Foo.txt";
    object missing = Type.Missing;
        doc.SaveAs(ref filename, ref missing, ref missing, ref missing,
    ref missing, ref missing, ref missing, ref missing, ref missing, ref
    missing, ref missing, ref missing, ref missing, ref missing, ref
    missing, ref missing);
```

Because the managed code language C# does not support optional parameters, an object (called "missing") is created boxing the parameter "Type.Missing".

All parameters are specified, even the "omitted" ones. For example:

```
object FileName = "Foo.docx";
object addBiDiMarks = true;
object missing = Type.Missing:
doc.SaveAs (ref FileName, ref missing, ref missing, ref missing,
ref missing, ref missing, ref missing, ref missing, ref missing, ref missing,
ref missing, ref missing, ref missing, ref missing, ref missing,
ref addBiDiMarks);
``` instead of being able to only specify the desired parameters, e.g.:

```
        doc.SaveAs(new DocumentSaveAsArgs
        {
            FileName = "Foo.docx";
            AddBiDiMarks = true
        });
```

To address these and other issues encountered when interfacing an object model using an interface written in a loosely-typed manner or using a strongly-typed interface that exposes a method with one or more loosely-typed parameters, and a calling program written in a strongly-typed language, (e.g., to enable a program written in a strongly-typed managed code language to call objects using a loosely-typed interface) extension methods may be employed to provide strongly-typed method overloads for the strongly-typed managed code equivalents of the loosely-typed method. Nullable types and object initialization may be used to provide strongly-typed optional parameters. Extension methods can be used to support parameterized properties and to support class indexers, enabling query of collections of in-memory objects.

Extension Methods for Shared Objects

Figure 1:
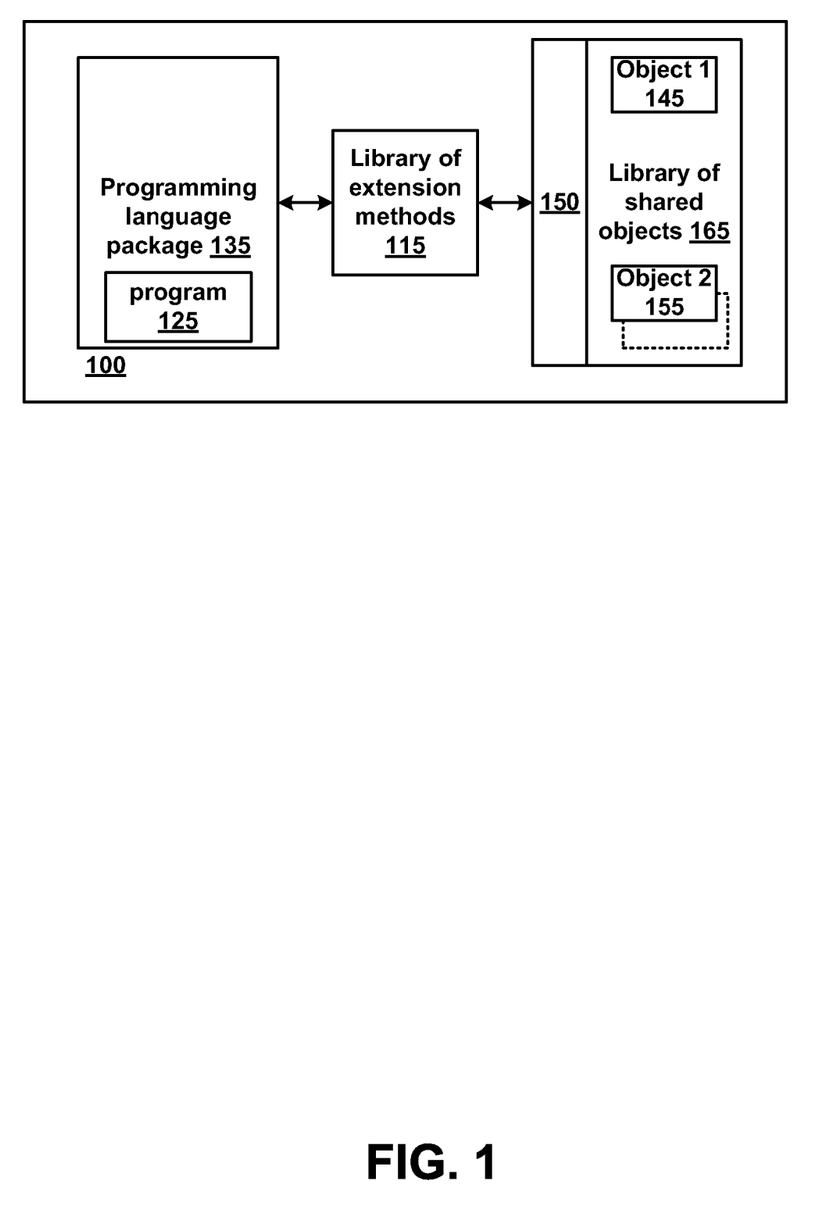
FIG. 1 is a block diagram of an example of a system that exposes extension methods for interfacing between objects and an application written in a managed code language in accordance with aspects of the subject matter disclosed herein.

FIG. 1 illustrates an example of a system 100 that provides extension methods that allow objects in a shared object model accessed via an interface written in a loosely-typed manner to be accessed by a program written in a managed code language that supports extension methods. The programming language may not support optional parameters (e.g., it may be a strongly-typed language). System 100 or portions thereof may reside or be stored on a computer such as the computer described below with respect to FIG. 3. System 100 may be a part of an integrated development environment or may be separate from and/or accompany an integrated development environment such as the one described below with respect to FIG. 4. The integrated development environment may be a common language runtime (CLR) managed code environment. System 100 may include one or more of the following: a programming language service 135, a library of extension methods 115 and/or a library of objects 165 accessed via an interface 150 written in a loosely-typed manner or an interface written in a strongly-typed manner that exposes a method with one or more loosely-typed parameters.

Extension methods such as those in library 115 allow the association of new methods with a class other than those originally declared by the class. That is, extension methods make it possible to extend existing types with additional methods. Although the extension methods are not actually part of the class, they appear to a developer to be part of the class. An extension method is declared as a static method but has a signature that identifies it as an extension of a particular identified class. For example, an extension method can be declared by specifying the keyword "this" as a modifier on the first parameter of the method. The managed language compiler looks at the object's type hierarchy for a matching method when it is resolving method names. If no matching method is found, the compiler searches for extension methods declared for that type within a declared universe (e.g., such as a universe of the namespaces included via "using" statements).

For example, a class Foo may be declared as:

```
public class Foo
{
    public void WriteHello( ) { System.Console.WriteLine("Hello!"); }
}
``` while an extension to class Foo (FooExtensions) may be declared as:

```
    public class FooExtensions
    {
        public void WriteGoodbye(this Foo foo) {
    System.Console.WriteLine("Goodbye!"); }
    }
```

Extension methods can enable more version-resilient code to be produced. For example, as an object model evolves, new optional parameters are often added to the end of an interface method's parameter list. When this occurs, the extension methods (e.g., library 115) can be updated and re-released so that user code which calls these methods does not have to change.

An extension method of the extension methods of library 115 may perform one or more of the following:

receive a special "arguments" object instance on which properties can be set as a part of the construction using object initializers, set logically-optional parameters in a programming language that does not support optional parameters, set parameterized properties in a programming language that does not support parameterized properties, employ variant parameters without boxing parameters in objects, thereby maintaining the strongly-typed benefits of a programming language, employ variant parameters that are passed by reference without creating a temporary object, and passing a reference to the object, query, project and filter data in arrays, enumerable classes, XML, relational database, and third party data sources, provide queries for a SQL-like query language used for filtering data in an e-mail and personal information management software product.

Programming language package 135 of system 100 may represent a language service including a program editor, user interface, and compiler. The programming language may be a managed language that supports extension methods such as Visual Basic® or C#. The managed language may be a strongly-typed, late-bound programming language such as C# or other language that does not support optional parameters, parameterized properties, use of variant parameters without boxing, etc. as described above. A program 125 may be a program written in the programming language of the package 135. Program 125 may call an object in library 165.

Library 165 represents a library of shared objects accessed via an interface 150 comprising a collection of methods by which the objects in library 165 are accessed. One or more of the shared objects such as object 1 145, object 2 155, etc. in library 165 may be accessed via one or more of the methods exposed by the interface 150 and may be called by calling program 125. One or more of the methods exposed by the interface 150 may have optional parameters, parameterized properties, uses a variant parameter, etc. as described above. Interface 150 may itself be loosely-typed or strongly-typed. One or more of the methods exposed by the interface 150 may have one or more one loosely-typed parameters. Objects in library 165 may be automation objects as described above, exported or made available by applications including but not limited to Microsoft® Word applications and Microsoft® Outlook® applications.

Strongly-Typed Method Overloads

Extension methods can simplify the interface between objects in an object model and a program written in a strongly-typed programming language as described above by providing method overloads that accept only required parameters or a subset of parameters comprising a desired set of most commonly used combination of parameters. Overloaded methods also improve type safety by accepting strongly-typed parameters. For example, the use of an object or value indicating a missing parameter such as Type.Missing is eliminated as is the need to pass parameters as objects. It will be appreciated that in the following description, examples are provided. The examples are meant to be illustrative rather than limiting and the subject matter disclosed herein applies to any suitable methods.

Using extension methods, an overload method can be declared for the most common uses of a method. For example, one of the most common uses of the Microsoft® Word Document SaveAs method is making a copy of a document. The SaveAs method has one logically-required parameter (the name of the document copy, e.g., FileName), and a number of optional parameters. An overloaded method for SaveAs may accept only the minimum number of parameters (e.g., only required arguments, such as for example, the overloaded method may accept only the FileName parameter for making a copy of a document), and all the parameters may be strongly-typed. Logically-optional parameters having value types such as Boolean, or enumerations, may be nullable, enabling a developer to pass a more natural and more strongly-typed "null" instead of Type.Missing when omitting a value.

An example of using the unextended SaveAs method follows:

```
object filename = "Foo.txt";
object missing = Type.Missing;
doc.SaveAs(ref filename, ref missing, ref missing, ref missing,
ref missing, ref missing, ref missing, ref missing, ref missing, ref missing,
ref missing, ref missing, ref missing, ref missing, ref missing, ref missing);
```

An example of an overloaded method in C# using extensions for making a copy of a document may be declared as:

An example of an overloaded method in C# using extensions for making a copy of a document may be declared as:

```
Public static class DocumentExtensions
{
    public static void SaveAs(this Document doc, string filename)
    {
        object fileNameObj = filename;
        object fileFormatObj = Type.Missing;
        ...
        object addBiDiMarksObj = Type.Missing;
        doc.SaveAs(ref fileNameObj, ref fileFormatObj, ..., ref addBiDiMarksObj);
    }
}
```

Use of this method is greatly simplified, as demonstrated below. The C# code to save a document Foo.docx using the SaveAs method extension to save a copy of the document may be:

```
// Save as new Microsoft ® Word document...
doc.SaveAs("Foo.docx");
```

Similarly, an overload method using extensions for converting a Microsoft® Word document to a different format may be declared as:

```
Public static void SaveAs(this Document doc, string filename,
    WdSaveFormat? fileFormat)
```

Use of this method is greatly simplified, as demonstrated below. The C# code to save a document Foo.html using the SaveAs method extension that saves a copy of the document in a different format may be:

```
// Save as new HTML document...
doc.SaveAs("Foo.html", WdSaveFormat.wsFormatHTML);
```

Strongly-Typed Optional Parameters

Strongly-typed optional parameters allow the natural use of null for missing values. When a method (such as but not restricted to the SaveAs method described above) has a large number of optional parameters or when there are no common scenarios for which a subset of parameters are actually specified, a single method override that accepts a single parameters class parameter can be provided. The class may contain or include a set of strongly-typed properties which map in a one-to-one relationship with the parameters passed to the interface (e.g., to the PIAs). The properties that are needed can then be set and the other properties can be ignored. Only the parameters that correspond to the set properties may have values then, when the underlying native method is called. In this way, optional parameter support in the managed code language (e.g., C#) can be obtained, without giving up strong typing, allowing the natural use of null for missing values. Value types such as int, Boolean and enumerations are also nullable.

For example, optional parameters for the methods such as the Microsoft® Word Document.SaveAs( ) method can be implemented as follows. Instead of individually passing the parameters, (e.g., filename, file format, etc.), many of which are likely to be "missing", an instance of the parameter class (e.g., DocumentSaveAsArgs class) can be created and passed, using object initialization to assign values to those properties necessary. Null properties will be passed to the native object model/managed code environment interface as the designated null value (e.g., Type.Missing).

Hence, one possible implementation for the DocumentSaveAsArgs class may be:

```
public class DocumentSaveAsArgs
{
    public string FileName { get; set; }
    public WdFileFormat? { get; set; }
    ...
    public bool? AddBiDiMarks { get; set; }
}
public static void SaveAs(this Document doc, DocumentSaveAsArgs args)
```

The C# code to pass several parameters to the SaveAs method thus might be:

```
Doc.SaveAs(new DocumentSaveAsArgs {
    FileName = "Foo.docx",
    AddBiDiMarks = false
});
```

The following shows one possible implementation of the method extension:

```
public sealed class DocumentSaveAsArgs : ExtensionArgs
{
    internal object FileNameInternal;
    internal object FileFormatInternal;
    ...
    internal object AddBiDiMarksInternal;
    public string FileName
    {
        get
        {
            return ToReference<string>(FileNameInternal);
        }
        set
        {
            FileNameInternal = ToObject(value);
        }
    }
    public WdSaveFormat? FileFormat
    {
        get
        {
            return ToValue<WdSaveFormat>(FileFormatInternal);
        }
        set
        {
            FileFormatInternal = ToObject(value);
        }
    }
    ...
    public bool? AddBiDiMarks
    {
        get
        {
            return ToValue<bool>(AddBiDiMarksInternal);
        }
        set
        {
            AddBiDiMarksInternal = ToObject(value);
        }
    }
```

```
}
public static class DocumentExtensions
{
    public static void SaveAs(this Document doc, DocumentSaveAsArgs args)
    {
        doc.SaveAs(
            ref args.FileNameInternal,
            ref args.FileFormatInternal,
            ...,
            ref args.AddBiDiMarksInternal);
    }
}
```

That is, the DocumentSaveAsArgs class can be derived from the ExtensionArgs base class, which provides the ToReference<T>( ), ToValue<T>( ), and ToObject<T>( ) helper methods. These helpers simplify the conversion between "real" types and their "boxed" equivalents and include logic for handling the "missing" indicator (e.g., Type.Missing). The parameter values themselves can be stored within internal fields of the DocumentSaveAsArgs class enabling the method extension to use them directly. The public properties expose the values to the developer as "real" types. Objects in this example are passed by reference. It will be apparent that parameter classes for other applications may not need this extra layer.

Object initializers allow properties to be set on a new instance of an object as part of the construction process. Traditionally, in a managed code or strongly-typed language such as C#, setting properties on an object requires the object to be created as a separate step. Alternatively, constructors could be created that accept the various property values. However, doing so for a large number of properties, each of which may or may not be set, is both tedious to write and tedious to use.

An example follows for the public class Foo having the following definition:

```
public class Foo
{
    public string HelloString { get; set; }
    public string GoodbyeString { get; set; }
}
public class Program
{
    public void Main( )
    {
```

An example of the traditional method of initialization is:

```
// Old initialization style.
Foo foo1 = new Foo( );
foo1.HelloString = "Hello!";
foo1.GoodbyeString = "Goodbye!";
``` in which creating the objects HelloString and GoodbyeString occur in separate steps.

In contrast, a special "arguments" object instance on which properties can be set as a part of the construction of the object using object initializers can be passed to the extension method as follows:

```
// New initialization style.
Foo foo2 = new Foo { HelloString = "Hello!", GoodbyeString =
"Goodbye!" };
  }
 }
}
``` in which creating the objects HelloString and GoodbyeString do not occur in separate steps.

Parameterized Properties

Properties within an object model may take parameters. In the C# interface, properties with parameters are converted to methods prefixed with get_ and set_. A Microsoft® Excel® program, for example, declares the following property:

Range Worksheet.Range(object ref1, object ref2)

Because C# does not support parameterized properties, a C# developer accesses a parameterized property via its get and set methods. For example:

```
Range Worksheet.get_Range(object ref1, object ref2)
can be simplified by defining the following extension methods:
public static Range Range(this Worksheet sheet, string ref)
public static Range Range(this Worksheet sheet, string ref1, string ref2)
``` which is equivalent to:

```
Range Worksheet.Range(string ref)
Range Worksheet.Range(string ref1, string ref2)
```

An example of a traditional means for obtaining the Microsoft® Excel® worksheet range is:

```
Range r1 = sheet.get_Range("A1:B1", Type.Missing);
Range r2 = sheet.get_Rang("A1":"B1");
```

An example of a new means for obtaining the Microsoft® Excel® worksheet range using extensions is:

```
Range r3 = sheet.Range("A1:B1");
Range r4 = sheet.Range("A1", "B1");
```

An object model may expose collection class indexers via parameterized properties as well. When the indexer supports multiple index types, the syntax can become convoluted. The following example is the Microsoft® Word Documents object indexer, which allows indexing by both integer order and document name:

Document Documents.get Item(ref object index)

This can be simplified by declaring the following extension methods:

```
public static Document Item(this Documents documentss, int index) {
object indexObj = index;
return documents.get_Item(ref indexObj);
}
public static Document Item(this Documents documents, string fileName) {
object fileNameObj = fileName;
```

```
return documents.get_Item(ref fileNameObj);
}
```

An example of a traditional means to obtain an open Microsoft® Word document is:

```
object index = 1;
object filename = "Foo.docx";
Document doc1 = app.Documents.get_Item(ref index);
Document doc2 = app.Documents.get_Item(ref filename);
```

Extensions provide a consistent index API. Collection interfaces have an Item( ) extension method. More than one extension method may be present for multiple types of indicies. Indices for Item( ) extension methods are strongly-typed. An example of a new means for obtaining an open Microsoft® Word document using extension methods is:

```
Document doc3 = app.Documents.Item(1);
Document doc4 = app.Documents.Item("Foo.docx");
```

LINQ to Objects

Language Integrated Query (LINQ) is a Microsoft .NET Framework component that adds native data querying capabilities to .NET languages using a syntax resembling SQL. LINQ declares a set of query operators that can be used to query, project and filter memory data encapsulated as objects in arrays, enumerable classes, XML, relational databases, and third party data sources. Queries written using the query operators are executed either by the LINQ query processing engine or, via an extension mechanism, handed over to LINQ providers which either implement a separate query processing engine or translate to a different format to be executed on a separate data store (such as on a database server as SQL queries). The results of a query are returned as a collection of in-memory objects that can be enumerated.

Collection classes in an object model may implement the Ienumerable interface, which enables a compiler to iterate over a collection of objects, however the type of the object is not known. A generic IEnumerable interface (denoted by ILEnumerable<T>) enables a compiler to iterate over a collection of objects of a known type. Extension methods wrap collection classes implementing the IEnumerable interface within an ILEnumerable<T> wrapper so that information concerning the type of the objects in the collection can be provided to the compiler. Extension methods return ILEnumerable<T> of a type appropriate to the collection. Querying in-memory objects in the same way queries are made to a database using LINQ relies on the strongly-typed ILEnumerable<T> interface.

Existing extension methods can generate an IEnumerable<T> reference from an Ienumerable reference (e.g. using the Cast<T>( ) and OfType<T>( ) methods). If the collection class implements IEnumerable, the collection class can be used in a LINQ expression by making an extra call to Cast<T>( ) on their collection class. Collections which do not implement IEnumerable require a custom extension method which loops over each item and returns a strongly-typed reference. The custom extension methods can be used in a LINQ query but, because of the different collection types, to use LINQ to Objects a developer tracks which collection types allow the use of the generic extension methods and writes custom ones for those that do not. This also means that the queries themselves will look very different depending on the pattern used.

To solve this inconsistency problem and eliminate the need to write custom LINQ to Objects code, a series of extension methods expose ILEnumerable<T> interfaces on collections in an object model (e.g., Office), enabling queries to be written in a clean and consistent manner. For example, the Microsoft® Outlook® Stores collection may have the following method extension:

```
public static IEnumerable<Store> Items(this Stores stores)
{
    return stores.Cast<Store>( );
}
```

This enables the developer to write a query like the following:

```
var query = from store in stores.Items( )
            where store.IsOpen
            select store.StoreID;
```

LINQ to DASL

The DAV Searching and Locating (DASL) query language is a SQL-like query language used for filtering e-mail and personal information (e.g., Microsoft® Outlook® items). It will be appreciated that although in the following description, Microsoft® Outlook® examples are provided, it will be understood that the subject matter described herein is not limited thereto and applies to any suitable information. Extension methods can provide a LINQ query provider for DASL by introducing an item class hierarchy with a common base case in which properties on classes correspond to DASL properties and where attributes attached to properties map to DASL properties. Items of the item class include a property that returns an underlying Microsoft® Outlook® item. Classes can be extended to map to new DASL or user-declared properties.

Searching can be exposed from Items and Application interfaces through the Application.AdvancedSearch( ), Items.Find( ), and Items.Restrict( ) extension methods. Properties within the query may have a URN convention, such as urn:schemas:httpmail:subject and urn:schemas:contacts:homepostaladdress. These properties may generally map to properties on the Microsoft® Outlook® item interfaces, MailItem.Subject and ContactItem.HomeAddress, respectively. Programmatic searches involve stringing together a series of expressions using these properties, then calling a method such as Items.Restrict( ). For example, to find all mail items that have "VSTO" in the subject and were sent over one week ago (assuming today is Jul. 16, 2007), the following query may be used:

```
@SQL=("urn:schemas:httpmail:subject" LIKE '%VSTO%' AND
"urn:schemas:httpmail:date" <= '7/9/2007 12:00 AM')
```

Property URNs are difficult to find, however, and are easily mistyped. Specific string and date/time formatting rules exist and no concept of strong-typing exists because queries are simple strings. Maintenance can be difficult (e.g., if the query syntax changes, all queries would need to be located and potentially modified) and the readability of such queries, especially as they become longer and more complicated, is reduced. All of these factors can make the generation of DASL query strings difficult for a developer.

A LINQ to DASL implementation using extension methods at runtime can generate an equivalent DASL query string from a LINQ expression written by a developer, pass it to the Microsoft® Outlook® search API and return the result.

A LTNQ to DASL implementation using extensions allows queries of both Microsoft® Outlook® item properties as well as custom user properties. An ItemsSource type performs queries on the Items collection of a single folder and an ApplicationSource type performs queries across multiple folders. Both types expose the IQueryable<T> and IQueryProvider interfaces used by LINQ.

```
public class ApplicationSource<T> : IQueryable<T>,
IQueryProvider { ... }
public class ItemsSource<T> : IQueryable<T>, IQueryProvider { ... }
```

While the sources can be instantiated individually, they can also be conveniently exposed via extension methods on the Items and Applications interfaces. The declarations of these methods are shown below.

```
public static IQueryable<OutlookItem> AsQueryable(this Items
items) { ... }
public static IQueryable<T> AsQueryable<T>(this Items items) { ... }
public static IQueryable<OutlookItem> AsQueryable(this
Application app) { ... }
public static IQueryable<T> AsQueryable<T>(this Application app) { ... }
```

The purpose of the OutlookItem type is to provide LINQ a concrete type for use in the WHERE and SELECT clauses of the query. It may also be used to provide the LINQ to DASL implementation a mapping between DASL properties and properties on the Microsoft® Outlook® item interfaces. Finally, the type may be used to provide a set of queryable properties common across all Microsoft® Outlook® item types, since the Microsoft® Outlook® object model does not declare a true item hierarchy. Each Microsoft® Outlook® item type has a corresponding OutlookItem-derived LINQ wrapper.

An excerpt of one possible OutlookItem definition is shown below.

```
public class OutlookItem
{
    [OutlookItemProperty("urn:schemas-microsoft-
      com:office:office#Keywords")]
    public string Categories { get; }
    public virtual UserProperties UserProperties { get; }
    public object Item { get; set; }
}
```

The OutlookItemPropertyAttribute above maps a DASL property to a property on the Microsoft® Outlook® item. The UserProperties property provides access to custom user properties declared on the item. (Reflection is used when dealing with unknown Microsoft® Outlook® item types.) The Item property is used to hold a reference to the underlying Microsoft® Outlook® item. This can be used, for example, to create a projection of the Microsoft® Outlook® items themselves rather than return the OutlookItem wrappers.

In addition to the standard Microsoft® Outlook® item properties, a developer can also query for a custom user property. For example, if the items have a boolean UserProperty called "IsArchived", the following query could be used to retrieve the items in which the property is set to true.

```
var archivedItems = from item in folder.Items.AsQueryable ( )
    where (bool) item.UserProperties["IsArchived"].Value
    select item.Item;
```

The LTNQ to DASL implementation is extensible in that it allows the developer to add support for additional Microsoft® Outlook® item properties or a strongly-typed UserProperty. For example:

```
public class MyItem : OutlookItem
{
    [OutlookItemUserProperty("IsArchived")]
    public bool IsArchived
    {
        get { return (bool) UserProperties["IsArchived"].Value; }
        set { UserProperties["IsArchived"].Value = value; }
    }
}
```

The developer can then perform a query such as one shown below.

```
var archivedItems =   from item in folder.Items.AsQueryable<MyItem>( )
where item.IsArchived
select item.Item;
```

Figure 2:
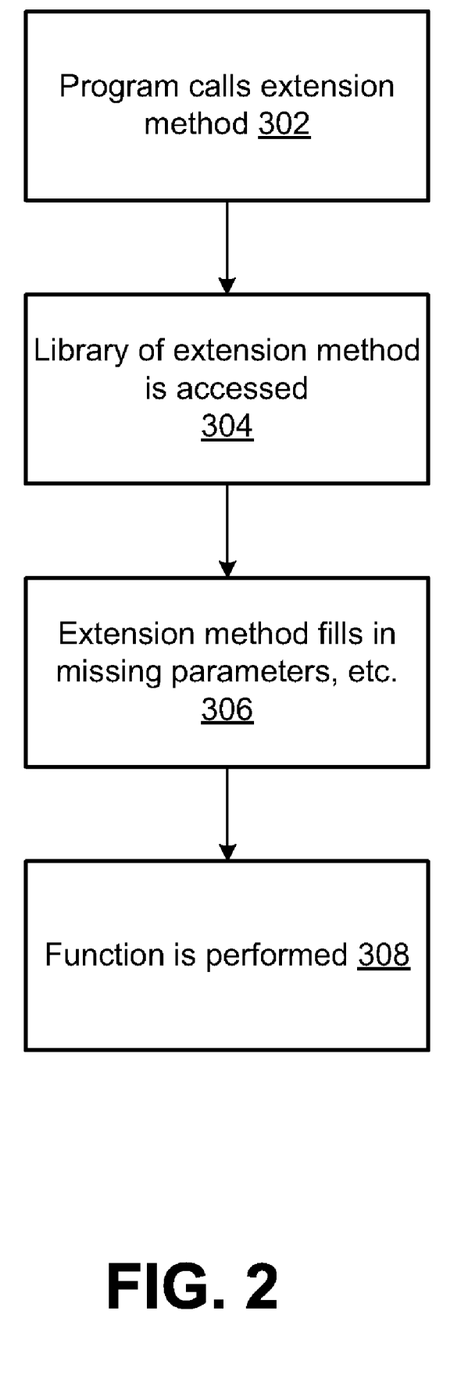
FIG. 2 is a flow diagram of an example of a method for exposing extension methods for interfacing between objects and an application written in a managed code language in accordance with aspects of the subject matter disclosed herein.

FIG. 2 illustrates an example of a method of using extension methods to call loosely-typed objects from a strongly-typed programming language. At 302 an application written in a managed language that supports extension methods calls a method of an object using an extension method to perform some function (e.g., to save a Microsoft® Word document, or to extract an object from a collection, or any other function). As described above, the program may send only required parameters, only the required and desired parameters or a subset of the parameters of the called method. Null values may be supplied for parameters, an instance of a parameter class may be sent (values may be stored inside) and so on as described above. At 304, the library of extension methods is accessed. At 306, the appropriate extension method in the extension library is determined and performs all the processing necessary (e.g. supplies the parameters not supplied by the calling application, etc. as described above). The extension method may expose a generic interface (e.g., Ienumerable <T>) on a collection of objects or enabling querying of a collection of objects in memory. Extension methods may create an item class hierarchy with a common base case in which properties on classes correspond to user-declared properties. The extension method may call the underlying native method, passing the potentially altered parameters. At 308 the function called is executed and the results are returned to the calling program Example of a Suitable Computing Environment In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The operating environment 510 is only one example of a suitable operating environment and is not intended to limit the scope of use or functionality of the subject matter disclosed herein.

Figure 3:
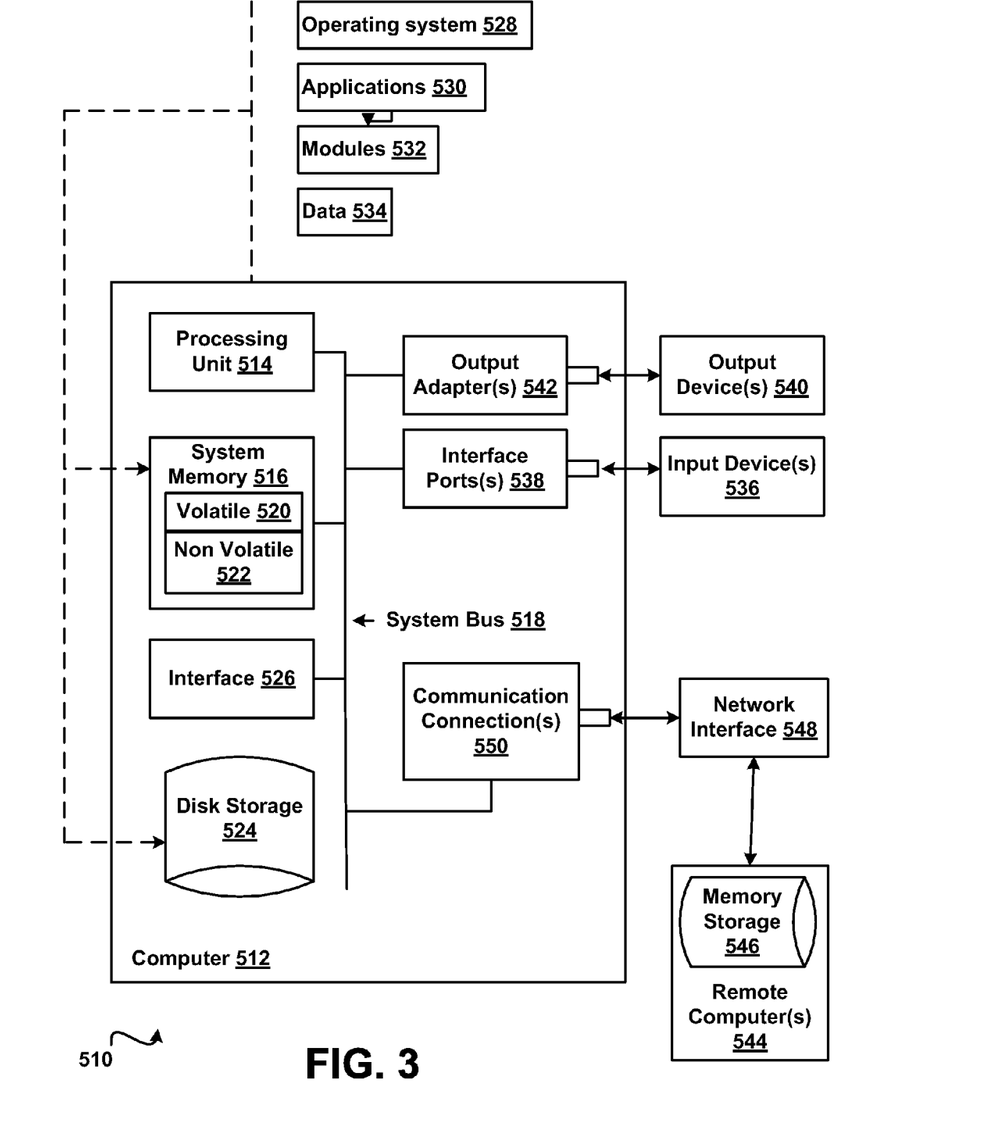
FIG. 3 is a block diagram illustrating an example of a computing environment in which aspects of the subject matter disclosed herein may be implemented.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. It should be noted that other devices and/or systems or devices such as remote computer(s) 544 provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 510 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
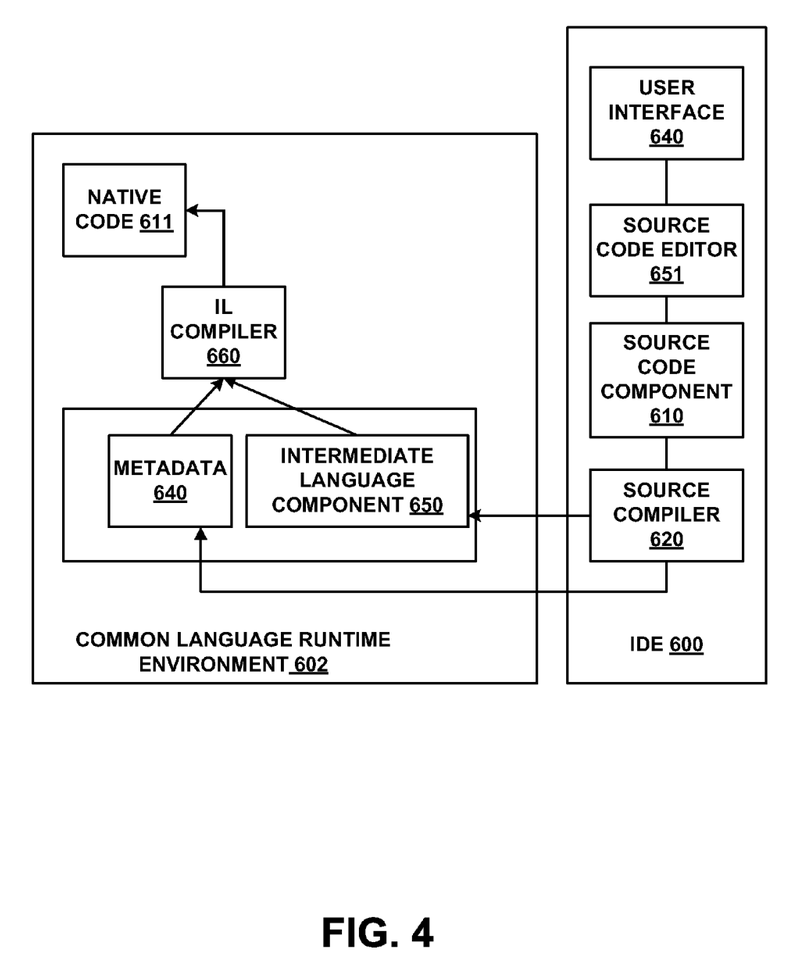
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic®, Visual J#®, C++. C#, Java® Script, APL, COBOL, Pascal, Eiffel, Haskell, ML, Oberon, Perl, Python, Scheme, Smalltalk and the like). The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 640. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A method of calling a Component Object Model (COM) object comprising:
  receiving a call to a method of the COM object from a calling program written in a managed programming language that supports extension methods, using a loosely-typed interface or using a strongly-typed interface comprising a method with at least one loosely-typed parameter;
  determining an extension method associated with the called method of the COM object, the extension method providing a strongly-typed method overload for a strongly-typed equivalent of the loosely-typed interface or providing a strongly-typed equivalent of the extension method with the at least one loosely-typed parameter;
  declaring an additional type for the COM object within the extension method, the additional type different than an existing type included in the method, wherein the declaring facilitates an enforcement of type safety for the COM object at compile time, the enforcement comprising a search for at least one additional type declared in the extension method;
  executing the extension method; and returning a result of executing the extension method to the calling program.

2. The method of claim 1, wherein the managed programming language is a strongly-typed programming language.

3. The method of claim 1, wherein the calling program is executed in a managed code environment comprising a common language runtime.

4. The method of claim 1, wherein at least one parameter is specified in the call and wherein the extension method supplies unspecified optional parameters.

5. The method of claim 1, wherein a parameter of the extension method is specified as null.

6. The method of claim 1, wherein the extension method returns an enumerable type of a queried collection.

7. The method of claim 1, wherein an object initializer initializes an instance of a parameter class, wherein the instance is passed to the extension method.

8. A system comprising:
a memory storing executable instructions; and
a library of extension methods stored on the memory, the library of extension methods comprising at least one extension method for a Component Object Model (COM) object of a plurality of extension methods, the at least one extension method comprising;
a strongly-typed equivalent of a loosely-typed interface or a strongly-typed equivalent of an extension method with at least one loosely-typed parameter;
a declaration of an additional type for the COM object different than an existing type for the COM object included in a called method, the declaration facilitating an enforcement of type safety for the COM object at compile time in which the enforcement includes a search for at least one additional type declared in the extension method; and
an accessibility to the at least one extension method, wherein the at least one extension method is accessed via the accessibility by a calling program written in a managed code programming language supporting extension methods.

9. The system of claim 8, further comprising a common language runtime managed code environment in which the library of extension methods is used.

10. The system of claim 8, wherein the managed programming language is a strongly-typed language.

11. The system of claim 8, wherein the at least one extension method accepts required parameters and supplies default values for non-required parameters.

12. The system of claim 8, wherein the at least one extension method accepts a single parameters class parameter, wherein a class of the parameters comprise strongly-typed parameters.

13. The system of claim 8, wherein an object initializer initializes an instance of a parameter class, wherein the instance is passed to the at least one extension method.

14. The system of claim 8, wherein the at least one extension method provides null unification on a type level for all types, the extension method boxing a value in a temporary object and passing a reference to the temporary object.

15. A computer-readable storage memory comprising computer-executable instructions that when executed cause a computing environment to:
receive a call to a method of an object from a calling program written in a managed programming language that supports extension methods, using a loosely-typed interface or using a strongly-typed interface comprising a method with at least one loosely-typed parameter;
determining an extension method associated with the called method of the object, the extension method providing a strongly-typed method overload for a strongly-typed equivalent of the loosely-typed interface or providing a strongly-typed equivalent of the extension method with the at least one loosely-typed parameter;
declaring an additional type for the object within the extension method, the additional type different than an existing type included in the called method, wherein the declaring facilitates an enforcement of type safety for the object at compile time, the enforcement comprising a search for at least one additional type declared in the extension method;
executing the extension method; and
returning a result of executing the extension method to the calling program.

16. The computer-readable storage memory of claim 15, comprising further computer-executable instructions such that when the extension method is executed:
properties are set on a new instance of an object as part of a construction process using object initializers.

17. The computer-readable storage memory of claim 15, comprising further computer-executable instructions such that when the extension method is executed:
an enumerable type of a queried collection of in-memory objects is returned.

18. The computer-readable storage memory of claim 15, comprising further computer-executable instructions such that when the extension method is executed:
a query string for an equivalent of an expression is generated, wherein the expression queries a collection of in-memory objects and wherein the query string queries e-mail information.

19. The computer-readable storage memory of claim 15, comprising further computer-executable instructions such that when the extension method is executed:
filter data in arrays or enumerable classes.

20. The computer-readable storage memory of claim 15, comprising further computer-executable instructions wherein the extension method:
accepts required parameters and supplies default values for non-required parameters.

* * * * *